Aug. 18, 1953 R. H. DUNN 2,649,580

ELECTRIC SIGNALING SYSTEM

Filed Sept. 19, 1950 6 Sheets-Sheet 1

Inventor
ROLAND H. DUNN

By Robert Harding Jr.
Attorney

Inventor
ROLAND H. DUNN
By Robert Harding Jr.
Attorney

Inventor
ROLAND H. DUNN
By Robert Harding Jr.
Attorney

Inventor
ROLAND H. DUNN
By Robert Harding Jr.
Attorney

Inventor
ROLAND H. DUNN
By Robert Harding Jr.
Attorney

Aug. 18, 1953

R. H. DUNN 2,649,580

ELECTRIC SIGNALING SYSTEM

Filed Sept. 19, 1950

6 Sheets-Sheet 6

Inventor
ROLAND H. DUNN

By Robert Harding
Attorney

Patented Aug. 18, 1953

2,649,580

UNITED STATES PATENT OFFICE 2,649,580

ELECTRIC SIGNALING SYSTEM

Roland Harris Dunn, London, England, assignor to International Standard Electric Corporation, New York, N. Y., a corporation of Delaware Application September 19, 1950, Serial No. 185,655
In Great Britain September 27, 1949

17 Claims. (Cl. 340—163)

This invention relates to electric signalling systems according to one of its features the invention consists of an electric signalling system comprising a communication channel, means for producing a carrier wave means for applying the said carrier wave to the communication channel at a transmitting point thereon and means for receiving the carrier wave from the communication channel at a receiving point thereon, means at the transmitting point for modulating the said carrier wave with information signals, means at the receiving point for demodulating the said carrier wave thereby separating the said information signals from the said carrier wave, means at the receiving point for distributing individual signal elements to individual utilization outlets, means for deriving transmitting synchronizing signals at the transmitting point from the said carrier wave, means for controlling the said modulating means therewith, means at the receiving point for deriving receiving synchronizing signals from the said carrier wave substantially isochronous with the said transmitting synchronizing signals, means for controlling the said distributing means by the said receiving synchronizing signal and means for procuring a predetermined phase relationship between the receiving synchronizing signals and the transmitting synchronizing signals.

According to another of its features the invention consists of an electric signalling system comprising a transmission path at a first point: carrier wave generating equipment connected to the transmission path and capable of producing two carrier frequencies, means for changing from one frequency to another means for recording in succession the conditions of a number of signal elements having one or another of two alternative conditions, means for operating the said frequency changing means successively in one sense or another in accordance with the conditions of the said signal elements, first means for producing first electric pulses and first means connected to the said transmission path, for driving the same, the said electric pulse having a repetition frequency equal to or proportional to the carrier frequency, first means for producing first electric impulses, one for every batch containing a predetermined number of the said electric pulses, means for controlling the successive operations of the frequency changing operation means in step with the said impulses; at a second point and connected to the said transmission path: means for detecting changes in the frequency of the carrier wave, switching means responsive to the detected frequency changes a number of recording means, means for setting the recording means in succession according to condition of the switching means at successive instants, second means for producing second electric pulses and second means connected to the transmission path for driving the same, the said electric pulses having a repetition frequency equal to or in the same proportion as the first electric pulses, to the carrier frequency second means for producing second electric impulses, one for every batch containing the said predetermined number of second electric pulses, means for using the second impulses for controlling the successive setting operations of the setting means, means for responding to a start signal, applied to the transmission path from the first point and received from the transmission path at the second point, operable to start the second electric impulses a fixed interval after the inception of the said start signal.

The invention will more readily be understood from the description of embodiment thereof shown in the accompanying drawings in which.

In electric signalling systems of the type where a series of signal elements is transmitted, each of which may consist of one of two alternative conditions and when a predetermined number of such signal elements together forming a series, for instance corresponding to a unit of information (e. g. a teleprinter character) according to a code, the problem arises of synchronizing the translating equipment at the receiving end with the timing of the sequence of signal elements.

One common method of doing this is the "start-stop" system wherein a signal element at the beginning of a sequence is utilized to start the translating equipment and an element at the end of the sequence to stop the translating equipment. The sending and receiving equipment can then be governed to work at approximately the same speed and will be able to drift in relative phase only during the transmission of a sequence of signal elements between a start and stop signal element and the error is not cumulative.

When the code in use requires only a small number of signal elements to represent a unit of information, there is little difficulty in governing the transmitting and receiving equipment with an acccuracy sufficient to keep the drift within the necessary tolerances, but as the number of signal elements to sequence is increased it becomes more difficult to ensure the necessary governing accuracy, and a point is reached when it is no longer economical to attempt it. It then becomes necessary to provide a positive means of synchronizing the transmitting and receiving equipments and methods have been proposed in which an additional communication channel is devoted to synchronization.

In electric transmission systems when a carrier frequency is modulated by the signals to be transmitted the two alternative conditions of a signal element can be represented by the presence or absence of the carrier frequency respectively or by one or other of two carrier frequencies between which the transmitting equipment can change under control of the signal elements.

With the former, the carrier frequency is not continuously present in the communication channel, but with the latter there is always a carrier frequency, at one or other of the two alternative frequencies, present in the communication channel.

It is now proposed to use the carrier frequency in the communication channel to govern the timing of both transmitting and receiving equipment.

Figure 1:
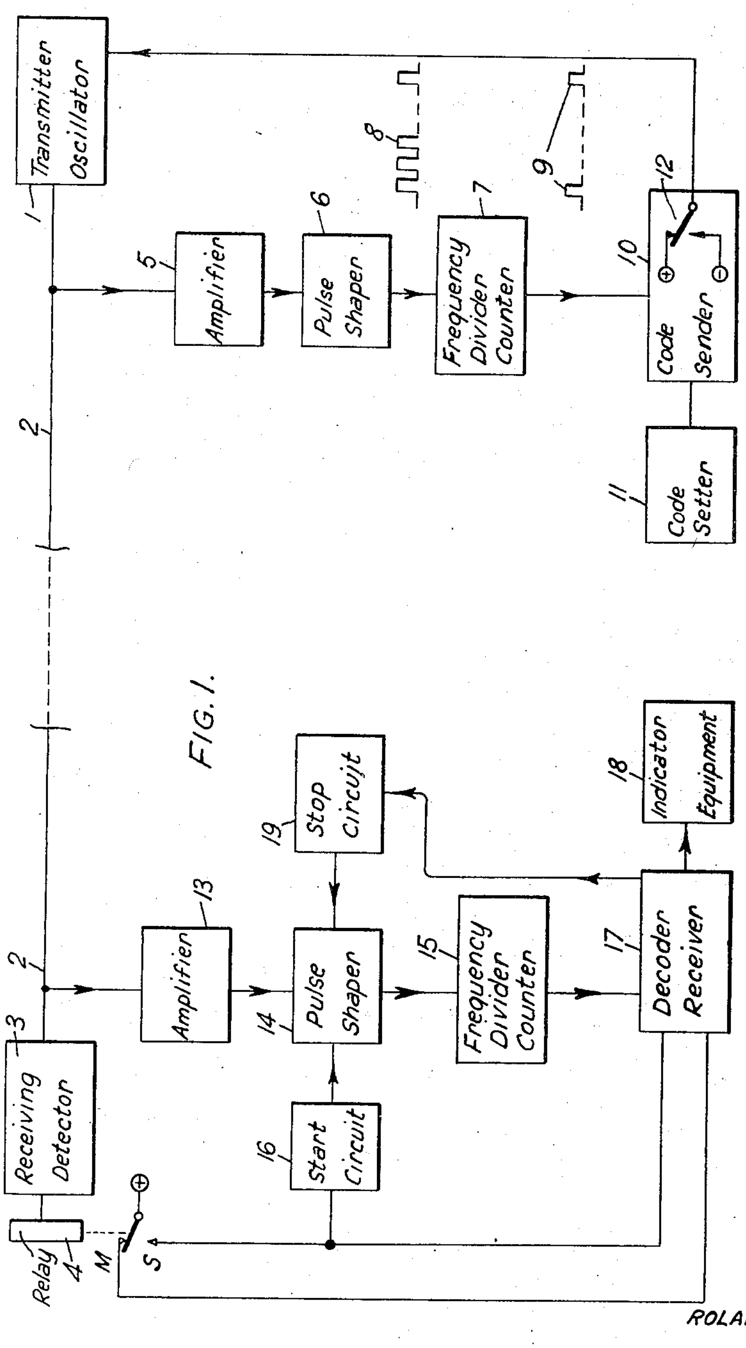
Fig. 1 is a block schematic diagram of the embodiment.

Fig. 1 shows schematically a signalling system with sending and receiving terminals connected by a line. A two-frequency transmitter oscillator 1 is connected by a line 2 to a receiving detector 3 which distinguishes between the two frequencies and operates a differential relay 4 in one sense for one frequency and in the other sense for the other frequency.

At the transmitting end (on the right-hand side of the drawing), line 2 is connected to an amplifier 5 which amplifies the carrier frequency and is followed by a pulse shaper 6 which produces one sharp pulse per cycle of the carrier frequency. Frequency-dividing counter 7 receives these pulses 8 and delivers an output pulse 9 once for each counted batch containing a predetermined number of the pulses 8. Pulses 9 feed and control the speed of a code sender 10 which is controlled by code setter 11, to send out a series of signal elements according to the information to be transmitted.

Code setter 11 sets coder sender 10 so that its change-over contacts 12 take up, in succession, the position corresponding to the condition (of the two alternative conditions) of each signal element in turn but the stepping of 10 from one signal element to the next is timed by pulses 9.

The change of frequency between the two alternative frequencies, in the line 2 when contacts 12 change over, gives rise to a difference in the time occupied by the signal element as between the two alternative conditions, but as both the carrier frequencies are many times greater than the signalling frequency and as the difference between the two carrier frequencies is relatively small, the difference is slight and has the effect of a slight difference in the time occupied by a signal element. There is no cumulative mistiming as between receiver and transmitter since the timing of the transmitted signal elements and of the synchronizing signals are varied in step with one another.

At the receiving end (on the left-hand side of the drawing), line 2, in addition to its connection to receiver detector 3, is connected to amplifier 13 and pulse shaper 14 which are similar to 5 and 6 respectively and have corresponding functions. The pulses from 14, which are synchronous with pulses 8 except perhaps for phase lag introduced by line 2 are applied to a frequency-divider counter 15 where they are counted to the same radix as in the case of 7. Pulse shaper 14 differs from 6 in that it does not run continuously, having a start circuit 16 connected to it which starts it under control of the armature of relay 4 which operates in response to a start signal element transmitted at the beginning of each signal sequence.

Decoder receiver 17 receives pulses from counter 15 which cause it to step through successive phases during each of which, a signal element is applied to it in the form of one of two alternative conditions applied by relay 4 under control of the signal elements translated by detector 3.

For each signal element, an individual utilization device in the indicator equipment 18 may be set in accordance with the condition of relay 4 at the time. In this arrangement, a number of utilization devices is provided equal to the number of signal elements between the start and stop signal of a transmitting cycle from the transmitting end and this arrangement is used when each code element represents the condition of an individual scanned object at the transmitting end and the function of each utilization device is to indicate the condition of an individual one of these scanned objects. A remote indication system is a typical example of this use of the invention.

Alternatively, decoder receiver 17, after passing through its various phases, may select one of several output conditions corresponding respectively to the alternative code-combinations provided and in this case indication equipment 18 will indicate the selection, which may represent, for instance, a character in a teleprinter or one of a number of indicators on a panel.

The starting and stopping of shaper 14 is effected as follows:

A start signal element operates relay 4 and starts shaper 14 by means of start circuit 16. As counter 15 counts pulses from shaper 14, the maximum error of timing is one cycle of the carrier frequency (one pulse period of the pulses from shaper 14).

It is advisable, for the elimination of possible errors, to scrutinize the condition of relay 4 in the middle of a signal element period which necessitates a delay in the operation of counter 15 which would otherwise step through its phases in synchronism with the change-over of the contacts 12 in code sender 10 at the transmitting end of the line.

This can be done by using the counter 15 to step off an appropriate number of pulses from shaper 14 to produce this delay, the output pulse to decoder 17 occurring part-way through the count for each signal element or alternatively, by a delay circuit inserted between start circuit 16 and counter 15.

The counter 15 must be stopped by positive means after driving decoder receiver 17 through the phases of its cycle and a stop circuit 19 actuated by the last decoding element of decoder 17 is provided for this purpose.

The stopping action is applied to pulse shaper 14 in preference to counter 15 itself since by this means the timing of the stopping instant can be arranged to have the accuracy of the line frequency pulses from the pulse shaper and the counter may be stopped at a definite part of its cycle each time, with that accuracy.

As an alternative, a separate element counter driven by counter 15, may be used, which would count pulses corresponding to the elements of a cycle of decoder 17 and shut off shaper 14 on completion of the count. In the detailed circuits to be described, however, decoder 17 incorporates a counting arrangement and an additional one is not required.

The detailed circuits of the said embodiment will now be described. In them, liberal use is made of two standard circuits units called "unit 1" and "unit 2" circuits.

Figure 2:
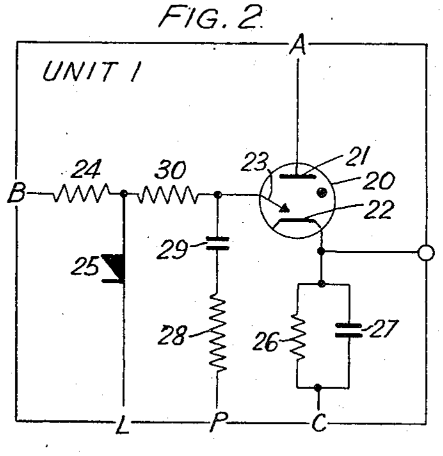
Figs. 2 and 3 are circuit diagrams of two circuit units from which parts of the equipment are built.

Unit 1, shown in Fig. 2, is a cold cathode gas tube circuit arranged to be used as a unit in a gas tube counting train.

This unit has a cold cathode tube 20 having an anode 21, a cathode 22 and a trigger anode 23.

A source of potential is applied to the anode of 20 via terminal A on the unit and the cathode is led out at terminal C on the unit.

There are three inputs to the trigger 23, from the unit terminals L, P and B respectively.

L is connected to a stabilized voltage supply. Pulses are applied at P through a resistor 28 and a capacitor 29, but are not alone sufficient to fire the tube. A resistor 30 is inserted between resistor 24 and trigger 23 to isolate the B terminal from the pulses. A priming bias is applied at B and when this is applied, the tube fires when a pulse is present.

The tube fires initially across the gap defined by electrodes 22-to-23 and only when this gap is fired can the gap defined by electrodes 22-to-21 fire, as the voltage at A is not sufficient to fire the gap defined by electrodes 22-to-21, unless the gas is ionized by the trigger discharge.

The purpose of resistor 24 and rectifier 25 is to stabilize the value of bias applied to the tube trigger and the circuit operates in the following manner.

Suppose resistor 24 to have a value of 500,000 ohms, a value found to be satisfactory. The bias potential applied to B is preferably of the order of 80 volts but it may not be constant at this value, in the circuit arrangement used.

The terminal L is connected to a stabilized voltage, preferably about 40 v. positive in relation to terminal C.

At rest, B will be effectively earthed, as will presently be seen. In these conditions, rectifier 25 will be biassed to relative non-conduction, and may have a resistance of the order of 30 megohms.

The voltage at the junction of resistor 24 and rectifier 25, and therefore at trigger 23, will be determined by a potential divider consisting of rectifier 25 at 30 megohms and resistor 24 at .5 megohm. This voltage will thus be $$40\times\frac{.5}{30.5}=\frac{2}{3}$$

of a volt approximately when B is earthed.

When 80 volts positive bias is applied to B, there will be a potential difference of 40 volts (80 volts bias minus 40 volts stabilized voltage) between B and L, which biasses rectifier 25 into conduction, and let it be supposed that the type of rectifier used has a "forward resistance" of the order of 30,000 ohms. The voltage at the junction of 24 and 25 and 30, is therefore $$40+\left(\frac{30}{530}\times 50\right)=42.8 \text{ volts}$$

and for 70 volts at B, $$40+\left(\frac{30}{530}\times 30\right)=41.7 \text{ volts}$$

Thus, a variation of 20 volts has been reduced to one of 1.1 volts.

When tube 20 fires, the current in the gap defined by electrodes 22-to-21 passes through a resistor 26, the value of which may be chosen to give a potential of about 80 volts across it, with this current flowing. Capacitor 27 in parallel with resistor 26 charges up to this potential and the voltage across electrodes 22 and 21 of the tube is reduced by this amount but is still enough to maintain the discharge.

When a number of unit 1 circuits are connected together as a self-running train, there is a common anode load between their A terminals and the positive terminal of the high tension power supply.

Terminal O of one unit is connected to terminal B of the next unit and the 80 volts at cathode 22 is passed to O and provides the priming bias applied to B of the next unit. Tube 20 of this next unit fires and the current in its gap defined by electrodes 22-to-21 passing through the common anode load still further reduces the voltage of the gap defined by electrodes 22-to-21 of the tube in the previous unit, which is already reduced by the 80 volts dropped across resistor 26, and this previous tube is extinguished.

The rise in current through the gap defined by electrodes 22-to-21 of the tube in the next unit is absorbed by capacitor 27 without dropping the voltage across resistor 26 of that unit until capacitor 27 is fully charged, by which time the tube of the previous unit has been extinguished which reduces the voltage drop across the common anode load. The tube just fired therefore continues to discharge until the tube of the next unit fires.

When the tube of a unit is extinguished the charge in its capacitor 27 leaks away through its associated resistor 26. Therefore terminal O of that unit and consequently terminal B of the next unit revert to earth potential, causing the trigger anode 23 of the tube in the latter unit to revert to a voltage of about ⅔ volt above earth as previously explained.

Figure 3:
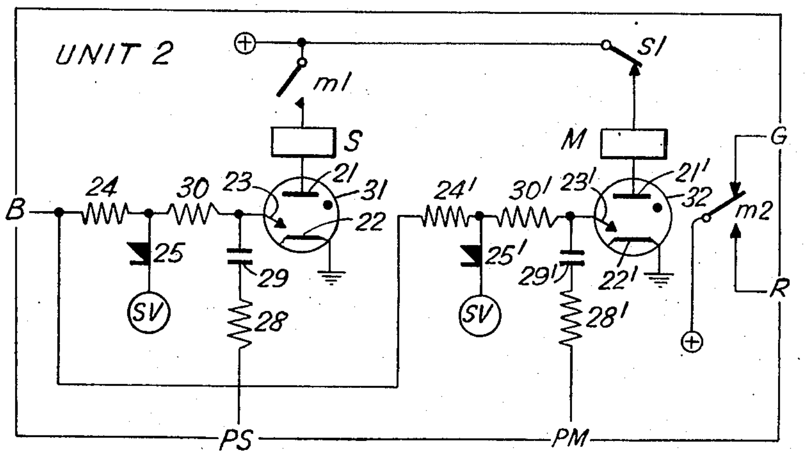

Unit 2, shown in Fig. 3, is intended as a marker unit. It has two gaseous discharge tubes 31 and 32 and their connections in many ways resemble the connections in unit 1. On account of this, corresponding components have been given corresponding reference numerals, the references being primed in the case of the tube on the right. Terminal B of unit 2 goes through resistors 24, 30 to the trigger electrode 23 of tube 31 and is also parallel-connected through 24′—30′ to the trigger electrode 23′ of tube 32. Each tube has a separate point P, these two points being called PS and PM respectively. Instead of terminal L as in unit 1, the junction of resistors 24 and 30 is shown going via rectifier 25 to SV which stands for "stabilised voltage," tube 32 being correspondingly connected in this respect. In the anode circuit of each of the tubes is a relay, tube 391 having the relay S in its anode circuit, tube 32 similarly having the relay M in its anode circuit. The anode circuit of tube 31 is broken at normally open contact $m1$, whereas the anode circuit of tube 32 is normally completed by normally closed contacts $s1$ of relay S. Contacts $m2$ are change-over contacts, the armature of which is shown connected to battery positive and the two contacts are connected respectively to terminals G and R. This, of course, is only one of many ways utilizing the marker and the $m2$ contacts can perform other change-over functions, in an external circuit. These units are connected at terminals B to an appropriate tube in a control counting train of unit-1 circuits. The appropriate unit-2 circuit is biased at points B in its turn.

The normal condition of the unit is that neither tube is fired and consequently neither relays S or M are operated; $mr2$ contacts will then be standing on the contact connected to G. To start the unit it is necessary for a potential to be applied to point PM which will cause tube 32 to fire, and continue discharging until a potential is applied to point PS. When tube 32 fires, relay M will operate and will complete the anode circuit of tube 31 at the $m1$ contact. Further potentials applied to PM will not affect the operation of the unit in which tube 32 will continue to discharge. When, however, a potential is applied to PS, tube 31 will fire and will operate relay S. This will extinguish tube 32 by opening contacts $s1$. This will, however, release relay M and will extinguish tube 31 by opening its anode circuit at $m1$ so that both tubes 31 and 32 will be extinguished. The device has, therefore, two stable conditions, both tubes 31 and 32 extinguished, which is a normal condition, and tube 32 fired, which is the off-normal condition. These two conditions are represented by a connection being made either to G or R at $m2$.

Figure 4:
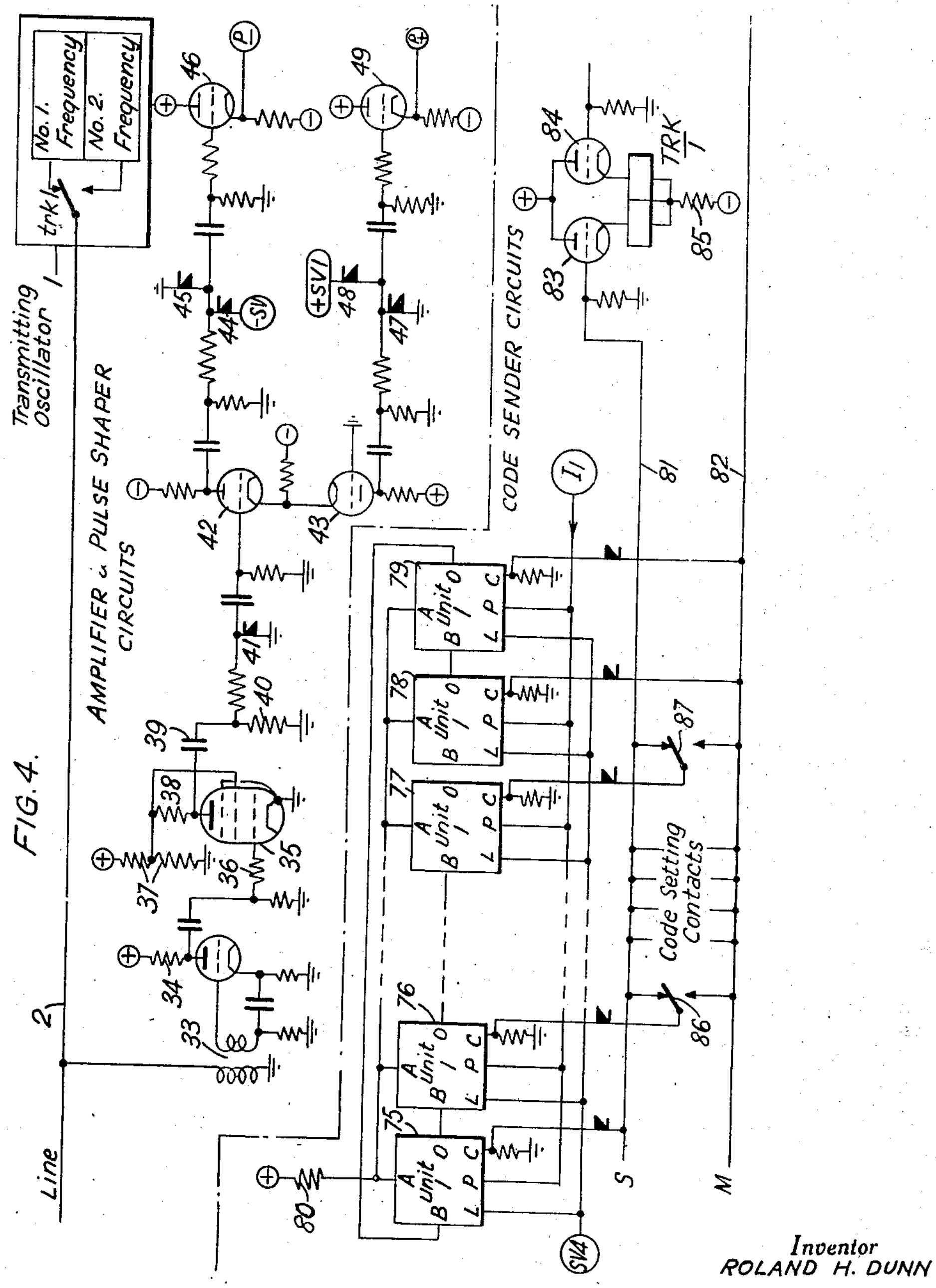
Fig. 4 shows amplifier and pulse shaper circuits and code sender circuits at the transmitting end of the embodiment.
Figure 5:
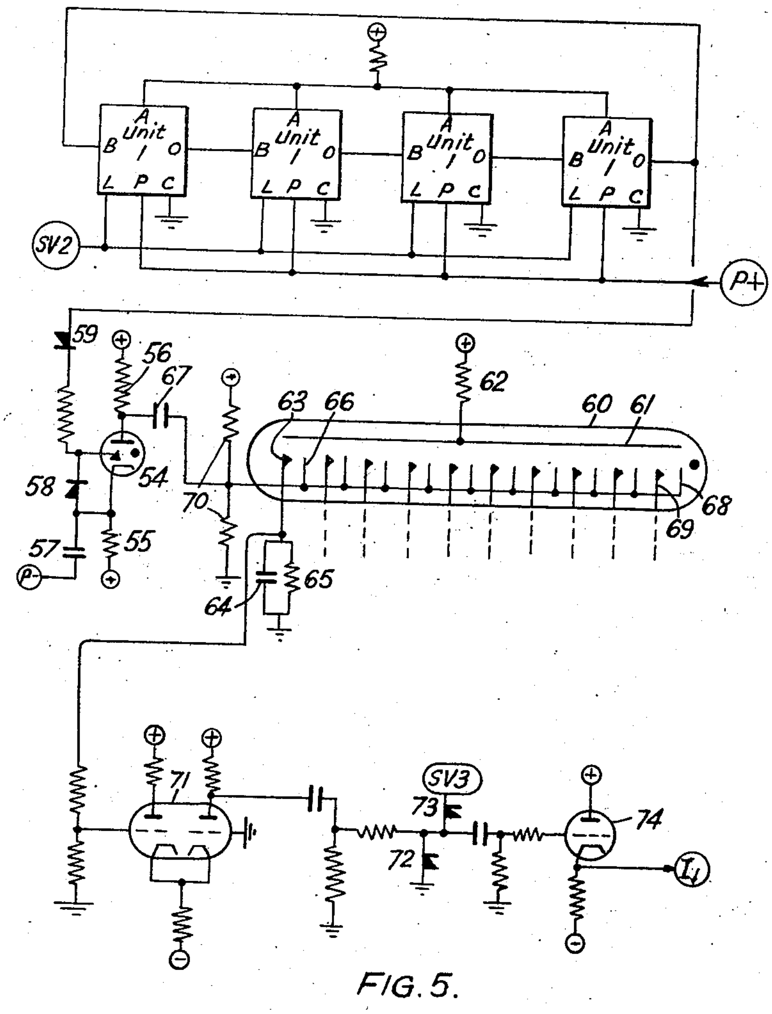
Fig. 5 shows frequency divider counter circuits at the transmitting end of the embodiment.

Figs. 4 and 5 show the detailed circuits at the transmitting end.

Fig. 4 shows the amplifier and pulse shaper circuits corresponding to blocks 5 and 6 of Fig. 1, the code sender circuits corresponding to 12 in block 10 of Fig. 1, and the code setting contacts corresponding to block 11 of Fig. 1. In the right-hand top corner of Fig. 4 the transmitting oscillator is shown diagrammatically.

Fig. 5 shows the frequency divider counter circuits corresponding to block 6 of Fig. 1.

In Fig. 4 a connection is made from line 2 to a transformer 33 whose secondary winding is connected to the grid of a triode tube 34, arranged as an amplifier stage. At the anode of tube 34 appear amplified sine waves at carrier frequency. These are applied to the control grid of a pentode tube 35.

Pentode 35 is connected as a conventional "squaring" stage and is driven to cut off by the negative half cycles of the sine wave applied to its control grid, and to saturation by the positive half-cycles.

Resistor 36 in the grid lead has a relatively high value to assist saturation by grid current. The screen voltage is stabilized by connection to a point on potential divider 37 to which the anode load resistor 38 is also returned and this also assists saturation.

The resulting square waveform is differentiated by capacitor 39 and resistor 40 to produce alternative negative and positive peaks at approximately the instants when the voltage waveform from the anode of tube 34 is at zero.

The negative peaks are removed by rectifier 41 which conducts and by-passes them to earth when the voltage drops below earth and stabilizes the voltage between the remaining positive peaks at substantially earth potential.

These positive peaks, one for each cycle of the carrier frequency are passed to valves 42 and 43 connected as a conventional cathode-coupled "phase splitting" circuit. Valve 42 reverses the polarity of the pulses which are subsequently limited to a stabilized negative potential called —SV by rectifier 44 which conducts when the pulse voltage falls negative in relation to —SV, and in the positive-going direction the potential is similarly limited to substantially earth potential by rectifier 45 which conducts when the voltage rises positive in relation to earth potential. Valve 46 connected as a cathode follower, repeats negative pulses limited substantially to —SV, to a terminal P— the pulses being also called P— hereafter.

Valve 43 does not change the polarity of the positive pulses from 39, 40, 41 and positive pulses from its anode are limited substantially to earth in the negative-going direction by a rectifier 47 and substantially to a positive stabilized voltage called +SV1 by a rectifier 48; rectifiers 47 and 48 being connected and operating in a similar manner to rectifiers 44 and 45 respectively.

The limited positive pulses are repeated by valve 49, connected as a cathode follower, to a terminal P+, the pulses being also called P+ hereafter.

Fig. 5 divides down the P+ pulse frequency by 40 times in two stages of four times and ten times respectively which provides a final impulse frequency of 50 per second from a carrier frequency of 2000 C. P. S., which is a typical example.

The four-stage divider has four unit-1 circuits 50, 51, 52, and 53 (shown in block form) and connected as a counting ring in the manner previously described, their L terminals all being connected to a stabilized voltage SV2.

It is convenient to note at this point that the type of tube used in the unit-1 circuits throughout this embodiment is not necessarily uniform throughout the equipment and in the case of blocks 50, 51, 52, 53 the freqeuncy to be handled is higher than in some other parts of the equipment and tubes capable of fast deionizing are sometimes necessary. Pulse, anode, and +SV2 potentials should be chosen according to the requirements of such tubes and these often differ from those required for the slower-acting type of tube.

The P terminals are connected in common to the P+ terminal (Fig. 5) and step from unit to unit at carrier frequency.

A pulse from the O terminal of unit-1 at 53 places a positive bias potential on the trigger electrode of a cold tube 54, lasting from one P+ pulse to the next, every fourth cycle of the carrier frequency.

The cathode of tube 54 is normally biassed positive through resistor 55, to a potential less than the anode potential to which the anode load resistor 56 is returned.

P— pulses are applied through capacitor 57 to the cathode but are normally ineffective to trigger tube 54. A rectifier 58 is connected between cathode and trigger electrode of tube 54, but is poled so as to be ineffective during P— pulses. Between pulses however, rectifier 58 acts as a virtual short circuit from trigger electrode to cathode due to the positive voltage applied through resistor 55 which renders it conducting. The trigger electrode of tube 54 is normally connected to earth which is connected to the C terminal of unit-1 at 53, via the high backward resistance of a rectifier 59.

When unit-1 of block 53 is not operated, therefore the trigger electrode of tube 54 is substantially at earth potential and the P— pulse voltage appears across the trigger electrode and cathode of tube 54, reduced by the positive voltage applied through resistor 55.

This is insufficient to strike the auxiliary gap of tube 54 but when unit-1 of block 53 operates, the positive bias potential applied through rectifier 59, to the trigger electrode, aided by the reduced P— pulse voltage applied to the cathode, causes auxiliary gap breakdown of tube 54 and instantaneous firing of the main gap by virtue of the positive anode potential applied through resistor 56, aided by the reduced P— pulse voltage. When tube 54 fires, the current causes a voltage drop in resistor 56 which gives a sharp negative output pulse at the anode.

At the end of the pulse, the only cathode-anode potential is the positive potential applied to the anode of tube 54, through resistor 56, reduced by the positive potential applied to the cathode through resistor 55 and as this is well below the maintaining potential of the tube, it immediately extinguishes.

Tube 54 therefore acts as a gate. It is opened by unit-1 of block 53 once every fourth cycle of the carrier frequency and whilst open, passes a P— pulse, with polarity unchanged from its anode.

It has been stated above, that the bias voltage from the O terminal of unit-1 of block 53 lasts from one P+ pulse to the next. Actually, due to the changing of capacitor 27, the voltage rise is exponential, reading maximum sometime before the second of these P+ pulses. Due to the discharge of capacitor 27 through resistor 26, the decay of this voltage is also exponential. The P— pulse which fires tube 54 (Fig. 5), is coincident with this second P+ pulse, the bias from unit-1 of block 53 being at the maximum value at the beginning of this P— pulse and falling away exponentially during the pulse as capacitor 27 in circuit of the unit-1 of block 53 discharges. As the pulse is short however, in relation to the time constant of resistor 26 and capacitor 27, the bias remains at an adequate value for a sufficient period of time to fire the auxiliary gap of the tube, and once fired, the bias can be removed without affecting the main gap discharge in tube 54.

Pulses from the anode of 54 are passed to a multi-gap cold cathode discharge tube 60 of the type described in U. S. Patent No. 2,553,585. Tube 60 has an anode 61, common to all the gaps, connected to a positive anode voltage supply through load resistor 62.

A number of cathodes ("main cathodes") such as the first, 63, are spaced equally from the anode 61 to form discharge gaps ("main gaps") and are connected outside the tube to earth via individual time-constant circuits such as capacitor 64 and resistor 65, only this one being shown in Fig. 5, the others being omitted to simplify the drawing.

Interleaved between these main cathodes are further cathodes, such as the first, 66 (transfer cathodes) spaced equally from the anode to form discharge transfer gaps and these cathodes are connected together and outside the tube, to the anode of tube 54, through coupling capacitor 67. The drawing shows these cathodes in a straight row but in an actual tube they are preferably in a closed ring, the last transfer cathode 68, being between the last main cathode 69 and the first main cathode 63, the spacing of the cathodes being uniform round the ring.

A fixed potential is applied to the transfer cathodes by connection to potential divider 70 but this is not sufficiently negative in relation to the anode potential to fire any of the gaps and is applied to adjust the pulse level.

The anode load resistor 62 is common to the main and transfer gaps and is of such value that the discharge current of two gaps in parallel causes a voltage drop thereacross sufficient to reduce the operating potential across the tube below the maintaining potential.

The potential condition across each of the main gaps is adjusted so that the gap will not fire unless the gas therein is ionized but is adequate to maintain the discharge in a fired main gap.

In operation, the tube fires in turn on the main gaps one at a time, the transfer from one main gap to the next being brought about by firing the intermediate transfer gap by a pulse.

It is usual to arrange for a particular main gap to be fired when the power is first switched on. This can be done by a number of means and it is only necessary to apply a negative surge momentarily to this main gap sufficient to raise the potential across this gap to the deionized firing voltage. This is not shown in the drawing.

The main cathodes are shaped so that the discharge spreads along the surface to one end (the "head") of the cathode which is spaced nearer to the anode than the other end (the "tail"). Then the ionization of the adjacent transfer gap on this side of the main gap is ionized to a greater extent than the transfer gap on the other side of the main gap. Once the discharge in a main gap is established, a voltage drop occurs across the resistor 65 of the time-constant circuit which is arranged so that the remaining voltage across this gap is only a little above the minimum discharge-maintaining potential.

A pulse applied to the transfer electrodes will fire the one nearest to the head of the discharging main gap, as it is ionized to a greater degree than the transfer gap on the tail side of the said main gap. The additional voltage drop in the anode load 62 extinguishes the main gap whose inter-electrode voltage is already reduced by the time constant circuit. The transfer gap remains discharging alone during the pulse as, despite ionization of adjacent gaps, the anode load voltage drop prevents other gaps from firing. At the end of the pulse, the discharging transfer gap extinguishes and the anode voltage drop ceases. The next main gap being ionized, now fires. The previously fired main gap is also ionized but is prevented from firing because of the voltage drop in its time-constant circuit which does not leak away quickly enough to restore the inter-electrode potential of this gap to the ionized firing potential.

If the tube is not initially fired at a selected main gap, a random transfer gap fires from the first pulse occurring after the power is switched on. Both adjacent main gaps are ionized and one fires. If it is the correct one in the firing sequence of the tube the tube operates normally at once. If it is the other one however, the initially fired transfer gap is again ionized from the head of this main gap and again refires on the next pulse. The same main gap cannot fire again however, because of the voltage across its time-constant circuit and the tube proceeds to operate in the correct direction.

Figure 7:
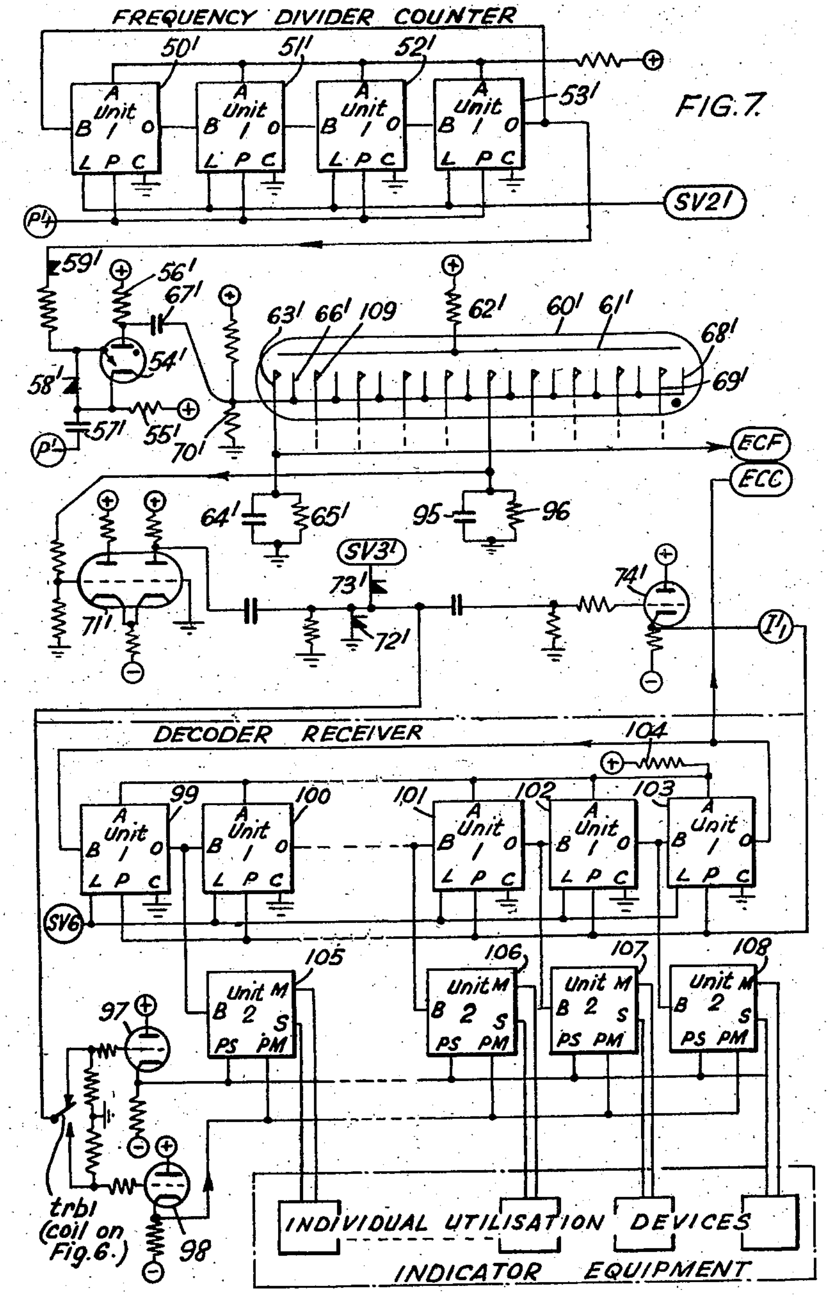
Fig. 7 shows frequency divider counter circuits decoder receiver circuits and indicator equipment at the receiving end of the embodiment.

The discharges move, pulse by pulse, from one main gap to the next, in the same direction, that is to say, from left to right in Figs. 5 and 7.

On the firing of a main gap, a positive voltage, being the voltage drop in the resistor of its time-constant circuit, may be taken from its cathode as from the O terminal of a unit 1 circuit.

In Fig. 5, such a voltage is taken from the first main cathode 63 and applied to one grid of a double triode valve 71.

The fact that in tube 60, a random gap commences to fire, is of no moment as it only happens when the apparatus is first switched on and only affects the timing of the first impulse to be delivered by the frequency divider counter, the phase of which is quite immaterial.

Valve 71 is connected as a conventional cathode-coupled "phase splitter," this circuit being used to obtain amplification without phase reversal by taking the output from the anode of the earthed grid half of the tube.

The resulting amplified positive impulse is limited between earth and a stabilized positive voltage SV3 by rectifiers 72 and 73 respectively, which operate in the same way as rectifiers 47 and 48 in Fig. 4. A cathode follower tube 74 repeats these impulses to a terminal $I_1$, the impulses themselves also being called $I_1$.

Returning now to Fig. 4, the coder sender circuits are seen to comprise a number of unit-1 circuits connected as a counting chain. Five of these unit-1 circuits are shown and are represented as blocks numbered 75, 76, 77, 78 and 79, intermediate ones between blocks 76 and 77 being omitted to simplify the drawing.

One unit-1 circuit at the beginning of the chain is devoted to the sending of a start signal and two at the end of the chain are devoted to the sending of stop signals as is common in teleprinter practice.

The O and B terminals of adjacent unit-1 circuits are interconnected and the O terminal of 79 is connected to the B terminal of 75.

The A terminals are connected through a common anode load resistor 80 to a positive anode voltage supply.

The L terminals are all connected to a source of stabilized positive voltage SV4 for the purpose already described in connection with Fig. 2. The C terminal of each circuit is connected through a resistance to earth and outputs in the form of positive square voltage impulses are taken from the C terminals. This is done in preference to taking the outputs from the O terminals because the voltage waveform at the C terminal rises steeply on the firing of the tube of the circuit, by virtue of the voltage drop across the external resistance between the C terminal and earth, whereas, as already explained, the voltage across the resistance 26 in a unit 1 circuit rises exponentially due to the charging current of capacitor 27 which initially bypasses 26.

The P terminals are connected in common to the $I_1$ terminal (from Fig. 5) and the circuits all operate in turn by the $I_1$ impulses from cathode follower 74 (Fig. 5).

On the commencement of operations, a random one of the circuits 75–79 operates and the first cycle may be only a partial one.

After reaching the ultimate unit-1 circuit 79 however, complete cycles are executed and the initial miscount is of no importance.

There are two conductors 81 and 82 connected to the grids of two triodes 83 and 84 in whose cathode circuits, two opposed windings of a relay TRK are inserted. When a positive potential is applied to one of the conductors, the corresponding valve conducts and operates TRK in one direction whilst a positive potential on the other conductor causes the other valve to conduct and operates TRK in the other direction. The operation of one valve tends to cut off the other by cathode bias developed in common cathode load resistor 85.

Conductor 81 has been marked "S" for "space" and 82, "M" for "mark." Unit 1 circuit 75 has its C terminal connected to conductor 81 and when it operates tube 83 conducts and TRK operates to the spacer condition. Unit-1 circuits 76, intermediate circuits not shown, and unit-1 77 have their C terminals connected over individual change-over contact sets 86—87 which connect them to conductors 81 or 82 according to the position of the contacts.

Unit-1 circuits 78 and 79 have their C terminals connected to conductor 82 and on operation cause tube 84 to conduct and operate relay TRK to the mark condition.

The contacts 86—87 are set in accordance with the information to be transmitted and may represent the condition of a number of scanned objects in a remote indication system for instance. South African Patent No. 11,659 describes such a system. Alternatively, they may be set mechanically or otherwise in the form of a code such as a teleprinter character code. It is possible of course to replace the counting chain of blocks 75–79 by a chain of the "tree" type as described in the U. S. Patent No. 2,565,511 issued to E. M. S. McWhirter et al. on August 28, 1951, operation at a selected point of the tree producing a code sequence of mark and space signals characteristic of that point. Relay TRK has contacts *trk1* which switch the transmitting oscillator 1 to one or other of the two carrier frequencies. This is shown diagrammatically in the top right hand corner of Fig. 4.

Figure 6:
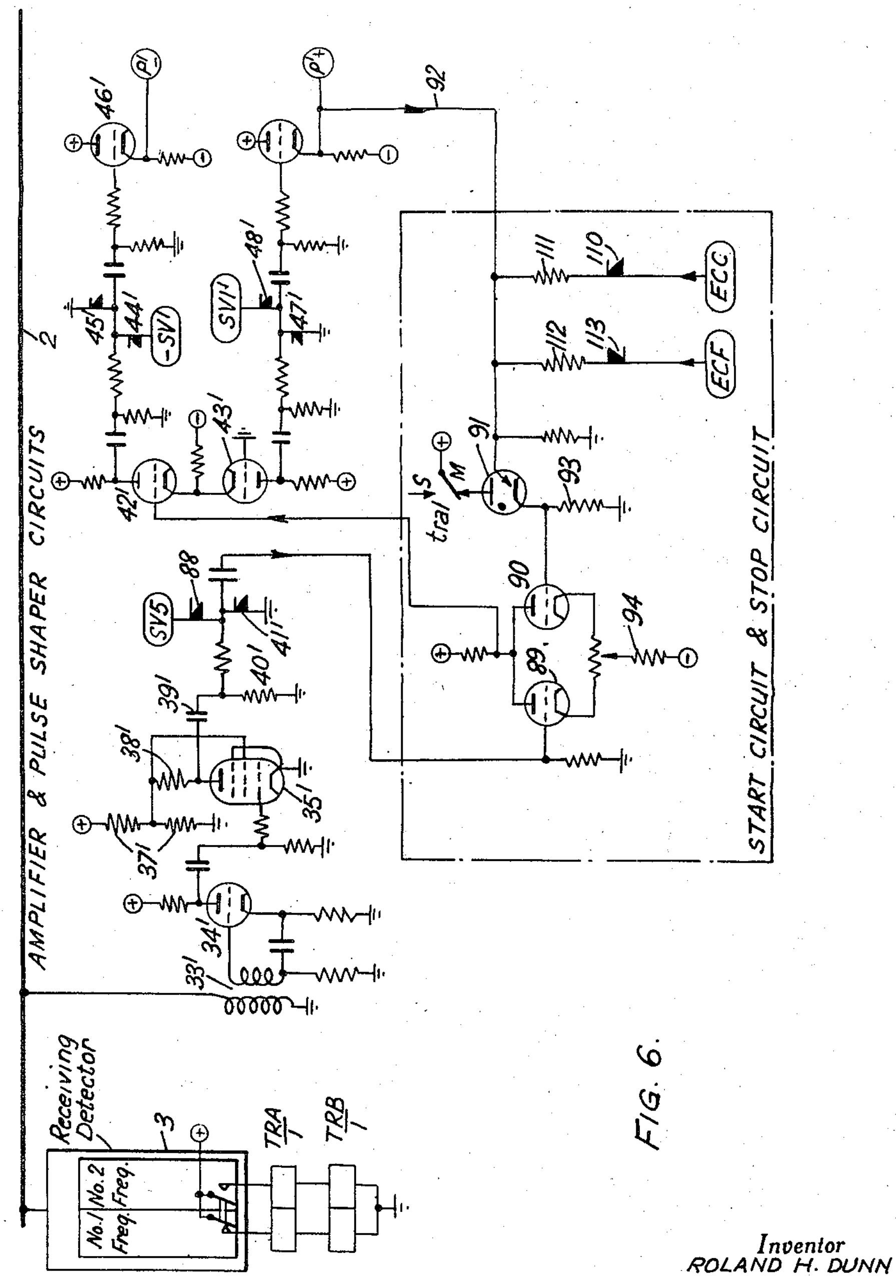
Fig. 6 shows amplifier and pulse shaper circuits and a start circuit and a stop circuit at the receiving end of embodiment.

Figs. 6 and 7 show the detailed circuits of the equipment at the receiving end; Fig. 6 showing the amplifier and pulse shaper circuits and the start and stop circuits; Fig. 7 showing the frequency divider counter circuits, the decoder receiver circuits and the indicator equipment, schematically. Turning to Fig. 6, line 2 enters along the top of the figure and joins the receiving detector 3, which operates two relays TRA and TRB having two opposed windings, each having like windings in series with the other and operated as the carrier frequency shifts to one frequency or the other. This is shown diagrammatically in the figure.

The contacts of relay TRB are on Fig. 7.

Tapped on to the line 2 are the amplifier and pulse shaper circuits and as these are similar to the corresponding circuits at the transmitting end, as previously described in connection with Fig. 4, corresponding items are given the same reference numerals and characters which are, however, primed. Only the differences between the two circuits will be described.

The squared and differentiated pulses from tube 35′, capacitor 39′, and resistor 40′ are not only limited to earth to eliminate the negative-going peaks but are also limited in the positive going sense to a stabilized positive potential SV5 by means of an additional rectifier 88. The circuit is interrupted before the entry to the phase splitter 42', 43' and passes through the start circuit and stop circuit.

The operation of the circuits of Figs. 4 and 6 is identical except that in Fig. 6, whilst the amplifier squarer differentiator and limiter circuits are running continuously, the input to the phase splitter 42', 43' and following circuits producing P'— and P'+ pulses is periodically cut and reconnected by the start and stop circuits. These circuits comprise two triodes 89 and 90 and a trigger gas discharge tube 91.

When the equipment is first switched on, tube 91 does not fire, although its anode circuit is completed over contacts *tra1* with relay TRA in the mark condition. The grid of tube 89 is biassed positively and the tube 89 passes along the differentiated and limited pulses from capacitor 39', resistor 40', rectifiers 41' and 88, applied to its grid, to phase splitters 42', 43'.

The P'+ and P'— pulses cause the frequency divider and counter (Fig. 7) to stop round until a certain point in their cycle is reached when the application of certain conditions to terminals ECC and ECF enable the P'+ pulses applied over conductor 92, to the trigger of tube 91, to become effective and fire the tube.

This will be described in detail later. When tube 91 fires, the voltage developed across its cathode resistor 93 applies a positive bias to tube 90 causing it to conduct whereupon the voltage developed across the common cathode load resistor 94 cuts off tube 89 and stops it from passing along the pulses P'— and P'+.

Tube 91 continues to discharge till a space condition in the line operates relay TRA to the space condition and breaks 91 anode circuit at *tra1*S. Triode 89 then conducts and pulses P'— and P'+ recommence. The purpose of positive limiting of the pulses by rectifier 88 is to prevent false opening of the gate tubes 89, 90 by excessive amplitudes applied to the grid of tube 89, which might force tube 90 to cut off against the bias from tube 91.

The frequency divider counter circuits then operate from the P'— and P'+ pulses until the final mark signals transmitted on operation of unit-1 circuits of blocks 78 and 79 in Fig. 4 cause contacts *tra1* to close the anode circuit of tube 91 and the conditions applied to ECC and ECF trigger tube 91.

The frequency divider and counter circuits at the receiving end, shown in the top half of Fig. 7 are similar to those at the transmitting end shown in Fig. 5 and corresponding items are given the same reference numerals and characters primed.

Only the differences betwen the circuits will be described.

The input to double-triode tube 71' from multi-gap tube 60' is taken from the main cathode whose time-constant circuit consisting of capacitor 95 and resistor 96 is shown as well as that of the first main cathode. This changes the phase of the I'1 pulses from tube 74' by five rounds of the counter consisting of the unit-1 circuit blocks 50'—53', that is to say by 20 cycles of the carrier frequency, as compared with the corresponding circuit in Fig. 5. The purpose of this will appear later. The limited impulses from rectifiers 72'—73' are tapped off and applied via changeover contacts *trb1* to one or other of two cathode follower tubes 97 or 98, which are similar to tube 74', and product I'1 impulses at the cathode of the valve which is operating. The decoder receiver is shown in the lower half of Fig. 7 and consists of a chain of unit 1 circuits of which blocks 99, 100, 101, 102, and 103 are shown, intermediate ones between blocks 100 and 101 being omitted to simplify the drawing.

These circuits are connected at their A terminals to a common anode load resistor 104 to the positive anode voltage supply and the C terminals are earthed. The P terminals are connected in common to the output of cathode follower 74' of the frequency divider counter from which they receive I'1 impulses, and the L terminals are connected in common to a stabilized voltage SV6.

The O and B terminals of adjacent units are interconnected and the O terminal of unit-1 circuit block 103 is connected to the B terminal of the unit-1 circuit of block 99.

The O terminal of each of these units except the last, 103, is connected to the B terminal of an individual unit-2 circuit of which only four blocks 105, 106, 107 and 108, are shown, intermediate ones between blocks 105 and 106 being omitted to simplify the drawing.

The unit-1 circuit blocks 99–103 operate in turn from successive I'1 impulses and the output at the O terminals of each consists of an exponentially rising voltage commencing at one impulse, reaching maximum at the next impulse and then falling exponentially.

The unit-2 circuit blocks 105–108 are connected at their PS terminals to cathode follower 97 and at their PM terminals, to cathode follower 98 and receiver I'1 impulses from one or the other according to whichever tube is conducting, which in turn is governed by the state of the *trb1* contacts.

When one of the unit-1 circuit blocks 99–103 operates, the corresponding unit-2 circuit receives a bias at its B terminal and changes condition if contacts *trb1* are in a different position from which they were in when the particular unit-1 circuit operated in the previous cycle. Otherwise, the corresponding unit-2 circuit does not change condition. The unit-2 circuits correspondingly operate or leave unchanged, their *m2* contacts.

The M and S terminals of the unit-2 circuits are shown connected to individual utilization devices which are indicated schematically only in Fig. 7.

These devices may be indicators, lamps or the like in a remote indication system, for instance.

The timing of the various operations will now be described.

At the transmitting end the changes from mark to space are timed to coincide with the I1 impulses and each signal element persists from one impulse to the next, successive signals of the same type being "run together."

The carrier frequency shift at the transmitting oscillator 1, produced by *trk1* (Fig. 4) is passed to line 2 and times the operation of relays TRA and TRB.

As I1 impulses are produced at the transmitting end on the firing of the first main cathode 63 of multi-gap tube 60 (Fig. 5), the operations of relays TRA and TRB at the receiving end (Fig. 6) also have this timing, subject to line distortion.

The space signal at the beginning of a signal code sequence, opens contacts *tra1* in Fig. 6 and starts P'− and P'+ pulses, missing an odd cycle of carrier frequency in relation to the relay change-over, as the pulse coinciding with the I1 impulse causing the change-over of contacts *tra1* is missed by gate circuit tubes 89, 90.

As will be explained, the frequency divider counter (Fig. 7) at the receiving end stops with unit-1 circuit block 50' operated. On being started, it requires three carrier frequency cycles before producing the first pulse in tube 54' and this first pulse transfers the discharge from main cathode 63' which is left discharging when the circuits are stopped, to the next main cathode 109. Another cycle of the first counting stage unit-1 circuit blocks 50'–53', occupies four cycles of the carrier frequency on the completion of which 60' makes another step. This is repeated three more times before the fifth main cathode of 60' is fired and the whole process has occupied 3+4+4+4+4=19 cycles of the carrier frequency and the one cycle lost in the starting from rest of the counter of Fig. 7 added to this, causes the $I'_1$ impulses from tubes 74', 97 and 98 to lag by 20 cycles of the carrier frequency, behind the I1 impulses at the transmitting end, subject to any line distortion.

The change-over of contacts *trb1*, however, is timed directly by the line signals to synchronize with the I1 transmitting end impulses, subject to line distortion. Thus, the energizing of each of the unit-2 circuits of blocks 105–108 is timed to occur 20 cycles of carrier frequency later than any corresponding change-over of contacts *trb1*. As the line signal elements persist from one I1 impulse to the next, the condition of the *trb* contacts is scrutinized in the middle of signal element period, unless the latter are mistuned by distortion. The maximum protection against a false indication is thus secured and the chance of scrutinizing the state of *trb1* at the moment of change-over is minimized.

At the end of a sequence of the code sender at the transmitting end, the two mark signals derived from unit-1 circuits 78 and 79 (Fig. 4) arrive. The $I'_1$ impulse generated at the receiving end corresponding to the first of these mark signals, causes the operation of the unit-1 circuit 103 which has no corresponding unit-2 marker circuit. There is a connection from the O terminal of circuit 103, to the ECC terminal and thence to the trigger of tube 91 (Fig. 6), through rectifier 110 and resistor 111 and when circuit 103 operates, a positive bias is applied to this terminal but is able to leak away to earth via resistor 112, rectifier 113, the ECF terminal (all on Fig. 6) and the time-constant circuit 64', 65' (on Fig. 7). This bias commences when the 6th main cathode of 60' fires and circuit 53' is operated, and it persists whilst, with repeated cycles of the counter chain 50'–53', the main cathodes of 60' fire in turn and first main cathode 63' is reached. The connection from main cathode 63' to terminal ECF carries a positive voltage to rectifier 113 (Fig. 6) when cathode 63' fires and biasses rectifier 113 to non-conduction. The bias from terminal ECC then becomes effective and tube 91 fires on the next P'+ pulse from 49' and closes gate tubes 89, 90. This same pulse is able to step the counter circuits 50'–53' and from circuit 53' to 50', the last named of which, is left operated till the circuits are started by the next space element.

Tube 60' is left discharging at cathode 63' as counter circuits 50'–53' does not complete a counting cycle to 53' to thereby pass another pulse through to tube 54' and thus to the transfer cathodes of tube 60'. The events previously described, which follow the initial space element at the beginning of a mean sequence, then repeat themselves.

If teleprinter signals are to be handled, the utilization devices may be mechanical devices set in a combination to reproduce a character at the end of the cycle or alternatively gas tube devices of the "tree" type can be substituted for the decoder-receiver as shown in Fig. 7. Such a device is described in the McWhirter patent above referred to.

To give reasonable economy of band-width, the change of the carrier frequency must in general, be small in relation to the carrier frequency and so the change in the intervals between I1 impulses and $I'_1$ impulses respectively, is correspondingly small. In any event, both change together and any transient effects at the moment of change can only cause an error of ± one cycle of the carrier frequency (2½%) which is immaterial as the change-over of contacts *trb1* is scanned midway between changes when the circuit has settled down.

The described embodiment is designed to pass a relatively small number of signal elements between the start and stopping of the receiving equipment but it is possible to let the receiving equipment continue working for more than one cycle of the decoder receiver and to transmit information signal elements continuously during this time. In fact, the stop circuit can be omitted and the whole system left running continuously once it is initially "phased" by the start circuit.

It is of little importance which gap in tube 60, (Fig. 5) at the transmitting end, fires when the power is first switched on. In the case of tube 60' (Fig. 7) at the receiving end however, a few cycles of the decoder receiver may be spoilt by random starting of tube 60' and it is preferable to fire cathode 63' as previously explained, on switching on the equipment. In any event, however, the equipment will go on operating till circuit 103 and tube 91 operate together to cut the P+ pulse supply at gate 89—90 and thereafter the receiving equipment will be in step with the transmitting equipment.

The circuits of the described embodiment are but one example of the invention which may take many other forms. For instance, the counting chains may be replaced by triggered delay circuits, each set to a delay period such that it just recovers for re-triggering, before the next pulse to be passed on.

While the principles of the invention have been described above in connection with specific embodiments and particular modifications thereof, it is to be clearly understood that this description is made only by way of example and not as a limitation on the scope of the invention.

What I claim is:

1. An electric signalling system comprising a communication channel, means for producing a carrier wave, means for applying the said carrier wave to the communication channel at a transmitting point thereon and means for receiving the carrier wave from the communication channel at a receiving point thereon, means at the transmitting point for modulating the said carrier wave with information signals, means at the receiving point for demodulating the said carrier wave thereby separating the said information signals from the said carrier wave, means at the receiving point for distributing individual signal elements to individual utilisation outlets, means for deriving transmitting synchronising signals at the transmitting point from the said carrier wave, means for controlling the said modulating means therewith, means at the receiving point for deriving receiving synchronising signals from the said carrier wave substantially isochronous with the said transmitting synchronising signals, means for controlling the said distributing means by the said receiving synchronising signal and means for procuring a predetermined phase relationship between the receiving synchronising signals and the transmitting synchronising signals.

2. A signalling system as claimed in claim 1 in which the said means for procuring a predetermined phase relationship between the receiving synchronising signals and the transmitting synchronising signals comprises means for starting the synchronising signals at a predetermined interval after the receipt at the receiving point, of a signal transmitted from the transmitting point.

3. A signalling system as claimed in claim 1 in which the said modulating means is operable to change the amplitude of the said carrier wave.

4. A signalling system as claimed in claim 1 in which the said modulating means is operable to change the phase of the said carrier wave.

5. A signalling system as claimed in claim 1 in which the said modulating means is operable to change the frequency of the said carrier wave.

6. A signalling system as claimed in claim 1 in which signal elements of the said information signals consist of one or the other of two alternative conditions.

7. A signalling system as claimed in claim 1 in which modulation consists of changing the frequency of the said carrier wave from one to another of two frequencies each corresponding to one of the said conditions of the information signal elements.

8. A signalling system as claimed in claim 1, wherein which the means for deriving the said transmitting synchronising signals and the means for deriving the said receiving synchronising signals, each comprise a frequency divider.

9. A signalling system as claimed in claim 8 in which the said two deriving means each comprise means for deriving a pulse from each cycle of the said carrier wave and in which the said frequency dividers each comprise a pulse counter.

10. A signalling system as claimed in claim 8, further comprising means at the receiving point for stopping the receiving synchronising signals on the completion of each information signal consisting of a fixed number of signal elements.

11. A signalling system as claimed in claim 10 wherein said stopping means operates after the transmission of a predetermined number of information signal elements immediately following the operation of the receiving synchronising signal start means.

12. A signalling system as claimed in claim 1 wherein the means for controlling the modulation of the carrier wave by the information signals operates to cause the transition from one information signal element to the next, and any consequent change of the carrier wave, at instants determined by the transmitting synchronising signals.

13. A signalling system as claimed in claim 1 in which the distributing means at the receiving point steps from one utilisation outlet to the next at instants determined by the receiving synchronising signals.

14. A signalling system as claimed in claim 1 in which receiving synchronising signals occur at times intermediate between the beginning and end of information signal elements as received at the receiving point.

15. A signalling system as claimed in claim 14 in which a received signal element is transmitted to a utilisation outlet at the instant of occurrence of a receiving synchronising signal.

16. An electric signalling system comprising a transmission path, at a first point: carrier wave generating equipment connected to the transmission path and capable of producing two carrier frequencies, means for changing from one frequency to another means for recording in succession the conditions of a number of signal elements having one or another of two alternative conditions, means for operating the said frequency changing means successively in one sense or another, in accordance with the conditions of the said signal elements, first means for producing first electric pulses and first means connected to the said transmission path for driving the same, the said electric pulses having a repetition frequency equal to or proportional to the carrier frequency, first means for producing first electric impulses, one for every batch containing a predetermined number of the said electric pulses, means for controlling the successive operations of the frequency changing operation means in step with the said impulses: at a second point and connected to the said transmission path: means for detecting changes in the frequency of the carrier wave, switching means responsive to the detected frequency changes a number of recording means, means for setting the recording means in succession according to condition of the switching means at successive instants, second means for producing second electric pulses and second means connected to the transmission path for driving the same, the said electric pulses having a repetition frequency equal to, or in the same proportion as the first electric pulses, to the carrier frequency second means for producing second electric impulses, one for every batch containing the said predetermined number of second electric pulses, means for using the second impulses for controlling the sucessive setting operations of the setting means, means for responding to a start signal, applied to the transmission path from the first point and received from the transmission path at the second point, operable to start the second electric impulses a fixed interval after the inception of the said start signal.

17. A signalling system as claimed in claim 16 comprising means for stopping the said second electric impulses on the completion of each information signal consisting of a fixed number of signal elements.

ROLAND HARRIS DUNN.

References Cited in the file of this patent

UNITED STATES PATENTS

| Number | Name | Date |
|---|---|---|
| 1,400,039 | Egerton | Dec. 13, 1921 |
| 2,444,950 | Nichols et al. | July 13, 1948 |
| 2,445,840 | Rauch | July 27, 1948 |
| 2,466,803 | Giffen et al. | Apr. 12, 1949 |
| 2,466,804 | Giffen et al. | Apr. 12, 1949 |
| 2,484,218 | Giffen | Oct. 11, 1949 |
| 2,495,652 | Coburn | Jan. 24, 1950 |
| 2,502,215 | Giffen et al. | Mar. 28, 1950 |